United States Patent
Xie

(10) Patent No.: US 9,537,871 B2
(45) Date of Patent: *Jan. 3, 2017

(54) SYSTEMS AND METHODS FOR CATEGORIZING NETWORK TRAFFIC CONTENT

(71) Applicant: Fortinet, Inc., Sunnyvale, CA (US)

(72) Inventor: Michael Xie, Menlo Park, CA (US)

(73) Assignee: Fortinet, Inc., Sunnyvale, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/568,368

(22) Filed: Dec. 12, 2014

(65) Prior Publication Data

US 2015/0101046 A1 Apr. 9, 2015

Related U.S. Application Data

(63) Continuation of application No. 14/284,935, filed on May 22, 2014, now Pat. No. 9,237,160, which is a
(Continued)

(51) Int. Cl.
*G06F 15/16* (2006.01)
*H04L 29/06* (2006.01)
(Continued)

(52) U.S. Cl.
CPC ............... *H04L 63/12* (2013.01); *H04L 12/24* (2013.01); *H04L 41/00* (2013.01); *H04L 43/08* (2013.01); *H04L 51/04* (2013.01); *H04L 12/585* (2013.01)

(58) Field of Classification Search
CPC ................................ H04L 51/12; H04L 12/585
(Continued)

(56) References Cited

U.S. PATENT DOCUMENTS 5,704,017 A 12/1997 Heckerman et al.
5,910,179 A 6/1999 Mohseni
(Continued)

FOREIGN PATENT DOCUMENTS

WO WO-9737454 A1 10/1997
WO WO-01/55905 A1 8/2001

OTHER PUBLICATIONS

U.S. Appl. No. 14/284,935, filed May 22, 2014, Systems and Methods for Categorizing Network Traffic Content.
(Continued)

*Primary Examiner* — Phuoc Nguyen
(74) *Attorney, Agent, or Firm* — Law Office of Dorian Cartwright; Dorian Cartwright

(57) ABSTRACT

A method for categorizing network traffic content includes determining a first characterization of the network traffic content determining a first probability of accuracy associated with the first characterization, and categorizing the network traffic content based at least in part on the first characterization and the first probability of accuracy. A method for use in a process to categorize network traffic content includes obtaining a plurality of data, each of the plurality of data representing a probability of accuracy of a characterization of network traffic content, and associating each of the plurality of data with a technique for characterizing network traffic content. A method for categorizing network traffic content includes determining a characterization of the network traffic content, determining a weight value associated with the characterization, and categorizing network traffic content based at least in part on the characterization of the network traffic content and the weight value.

20 Claims, 5 Drawing Sheets

Related U.S. Application Data continuation of application No. 13/795,390, filed on Mar. 12, 2013, now Pat. No. 8,782,223, which is a continuation of application No. 13/153,889, filed on Jun. 6, 2011, now Pat. No. 8,635,336, which is a continuation of application No. 12/403,996, filed on Mar. 13, 2009, now Pat. No. 7,979,543, which is a continuation of application No. 10/993,629, filed on Nov. 19, 2004, now Pat. No. 7,565,445.

(60) Provisional application No. 60/580,841, filed on Jun. 18, 2004.

(51) Int. Cl.
*H04L 12/24* (2006.01)
*H04L 12/26* (2006.01)
*H04L 12/58* (2006.01)

(58) Field of Classification Search
USPC ............................................................ 709/206
See application file for complete search history.

(56) References Cited

U.S. PATENT DOCUMENTS

| | | | |
|---|---|---|---|
| 5,933,827 A | 8/1999 | Cole et al. | |
| 5,999,975 A | 12/1999 | Kittaka et al. | |
| 6,035,423 A | 3/2000 | Hodges et al. | |
| 6,044,367 A | 3/2000 | Wolff | |
| 6,088,804 A | 7/2000 | Hill et al. | |
| 6,161,130 A * | 12/2000 | Horvitz et al. | G06F 17/30707 707/999.005 |
| 6,233,618 B1 * | 5/2001 | Shannon | G06F 17/30887 707/999.01 |
| 6,460,036 B1 | 10/2002 | Herz | |
| 6,484,315 B1 | 11/2002 | Ziese | |
| 6,651,099 B1 | 11/2003 | Dietz et al. | |
| 6,718,367 B1 * | 4/2004 | Ayyadurai | H04L 12/585 370/260 |
| 6,725,377 B1 | 4/2004 | Kouznetsov | |
| 6,782,527 B1 | 8/2004 | Kouznetsov et al. | |
| 6,912,550 B2 * | 6/2005 | Zhang et al. | G06F 17/30115 |
| 6,981,040 B1 | 12/2005 | Konig et al. | |
| 7,089,241 B1 | 8/2006 | Alspector et al. | |
| 7,158,986 B1 | 1/2007 | Oliver et al. | |
| 7,162,538 B1 | 1/2007 | Cordova | |
| 7,219,148 B2 | 5/2007 | Rounthwaite et al. | |
| 7,246,150 B1 | 7/2007 | Donoho et al. | |
| 7,277,926 B1 | 10/2007 | Lee | |
| 7,292,531 B1 | 11/2007 | Hill | |
| 7,320,020 B2 | 1/2008 | Chadwick et al. | |
| 7,343,604 B2 * | 3/2008 | Grabarnik | G06F 8/427 709/223 |
| 7,379,993 B2 | 5/2008 | Valdes et al. | |
| 7,406,502 B1 * | 7/2008 | Oliver | H04L 12/585 709/206 |
| 7,421,498 B2 | 9/2008 | Packer | |
| 7,451,487 B2 * | 11/2008 | Oliver | G06F 21/51 709/206 |
| 7,480,297 B2 | 1/2009 | Ramanna et al. | |
| 7,565,445 B2 | 7/2009 | Xie | |
| 7,577,721 B1 | 8/2009 | Chen | |
| 7,590,694 B2 * | 9/2009 | Yu | G06Q 10/107 709/206 |
| 7,600,257 B2 | 10/2009 | Dubrovsky et al. | |
| 7,639,613 B1 | 12/2009 | Ghannadian et al. | |
| 7,664,048 B1 | 2/2010 | Yung et al. | |
| 7,672,275 B2 | 3/2010 | Yajnik et al. | |
| 7,681,032 B2 | 3/2010 | Peled et al. | |
| 7,725,544 B2 | 5/2010 | Alspector et al. | |
| 7,760,722 B1 | 7/2010 | Tripathi et al. | |
| 7,774,839 B2 | 8/2010 | Nazzal | |
| 7,814,089 B1 | 10/2010 | Skrenta et al. | |
| 7,979,543 B2 | 7/2011 | Xie | |
| 7,992,142 B2 | 8/2011 | Hartshorne et al. | |
| 8,046,832 B2 | 10/2011 | Goodman et al. | |
| 8,108,429 B2 | 1/2012 | Sim-Tang et al. | |
| 8,468,229 B2 * | 6/2013 | Alessi | G06F 17/30864 707/706 |
| 8,635,336 B2 | 1/2014 | Xie | |
| 8,776,229 B1 | 7/2014 | Aziz | |
| 8,782,223 B2 | 7/2014 | Xie | |
| 2002/0009070 A1 | 1/2002 | Lindsay et al. | |
| 2002/0009079 A1 | 1/2002 | Jungck et al. | |
| 2002/0032772 A1 | 3/2002 | Olstad et al. | |
| 2002/0083175 A1 | 6/2002 | Afek et al. | |
| 2002/0083195 A1 | 6/2002 | Beshai et al. | |
| 2002/0124181 A1 | 9/2002 | Nambu | |
| 2002/0133586 A1 | 9/2002 | Shanklin et al. | |
| 2002/0178223 A1 | 11/2002 | Bushkin | |
| 2003/0110280 A1 | 6/2003 | Hinchliffe et al. | |
| 2003/0172163 A1 | 9/2003 | Fujita et al. | |
| 2003/0195937 A1 * | 10/2003 | Kircher, Jr. | G06Q 10/107 709/207 |
| 2004/0030741 A1 | 2/2004 | Wolton et al. | |
| 2004/0128355 A1 * | 7/2004 | Chao | H04L 63/14 709/206 |
| 2004/0146006 A1 | 7/2004 | Jackson | |
| 2004/0153666 A1 | 8/2004 | Sobel | |
| 2005/0050150 A1 * | 3/2005 | Dinkin | G06Q 10/107 709/207 |
| 2005/0071741 A1 | 3/2005 | Acharya et al. | |
| 2005/0091321 A1 | 4/2005 | Daniell et al. | |
| 2005/0091322 A1 * | 4/2005 | Hogstrom | H04L 12/5855 709/206 |
| 2005/0102366 A1 * | 5/2005 | Kirsch | G06Q 10/107 709/207 |
| 2005/0192992 A1 | 9/2005 | Reed et al. | |
| 2005/0283470 A1 | 12/2005 | Kuntzman et al. | |
| 2006/0036728 A1 | 2/2006 | Xie | |
| 2006/0168006 A1 | 7/2006 | Shannon et al. | |
| 2006/0265498 A1 * | 11/2006 | Turgeman | G06Q 10/107 709/225 |
| 2007/0203997 A1 | 8/2007 | Ingerman et al. | |
| 2009/0177754 A1 | 7/2009 | Brezina et al. | |
| 2009/0234879 A1 | 9/2009 | Xie | |
| 2011/0215162 A1 | 9/2011 | Challa et al. | |
| 2011/0231402 A1 | 9/2011 | Xie | |
| 2012/0311434 A1 | 12/2012 | Skrenta et al. | |
| 2013/0014261 A1 | 1/2013 | Millliken et al. | |
| 2013/0262667 A1 | 10/2013 | Xie et al. | |
| 2014/0258520 A1 | 9/2014 | Xie | |

OTHER PUBLICATIONS

"Accurate Attack Protection", Juniper Networks, (2005), 6 pgs.

"Anti-Virus Software Distribution: Managing the Distribution of Anti-Virus Upgrades and Updates Across the Enterprise", Network Associates, (1997), 7 pgs.

"U.S. Appl. No. 10/993,629, Advisory Action mailed Oct. 17, 2008", 3 pgs.

"U.S. Appl. No. 10/993,629, Final Office Action mailed Jun. 11, 2008", 10 pgs.

"U.S. Appl. No. 10/993,629, Non Final Office Action mailed Dec. 13, 2007", 11 pgs.

"U.S. Appl. No. 10/993,629, Notice of Allowance mailed Jan. 26, 2009", 6 pgs.

"U.S. Appl. No. 10/993,629, Response filed Mar. 13, 2008 to Non Final Office Action mailed Dec. 13, 2007", 21 pgs.

"U.S. Appl. No. 10/993,629, Response filed Sep. 11, 2008 to Final Office Action mailed Jun. 11, 2008", 16 pgs.

"U.S. Appl. No. 10/993,629, Response filed Nov. 13, 2008 to Advisory Action mailed Oct. 17, 2008", 21 pgs.

"U.S. Appl. No. 10/993,629, Supplemental Notice of Allowability mailed Sep. 21, 2009", 17 pgs.

"U.S. Appl. No. 12/403,996, Final Office Action mailed May 14, 2010", 8 pgs.

"U.S. Appl. No. 12/403,996, Non-Final Office Action mailed Oct. 6, 2009", 10 pgs.

(56) References Cited

OTHER PUBLICATIONS

"U.S. Appl. No. 12/403,996, Notice of Allowance mailed Mar. 8, 2011", 12 pgs.
"U.S. Appl. No. 12/403,996, Response filed Feb. 8, 2010 to Non Final Office Action mailed Oct. 6, 2009", 9 pgs.
"U.S. Appl. No. 12/403,996,Response filed Jan. 3, 2011 to Final Office Action mailed May 14, 2011", 9 pgs.
"U.S. Appl. No. 13/153,889, Non Final Office Action mailed Apr. 12, 2013", 9 pgs.
"U.S. Appl. No. 13/153,889, Notice of Allowance mailed Sep. 13, 2013", 12 pgs.
"U.S. Appl. No. 13/153,889, Response filed Jul. 10, 2013 to Non Final Office Action mailed Apr. 12, 2013", 11 pgs.
"U.S. Appl. No. 13/795,390, Non Final Office Action mailed Dec. 6, 2013", 9 pgs.
"U.S. Appl. No. 13/795,390, Notice of Allowance mailed Apr. 4, 2014", 10 pgs.
"U.S. Appl. No. 13/795,390, Response filed Jan. 2, 2014 to Non Final Office Action mailed Dec. 6, 2013", 8 pgs.
"U.S. Appl. No. 14/284,935, Advisory Action mailed Apr. 13, 2015", 2 pgs.
"U.S. Appl. No. 14/284,935, Final Office Action mailed Oct. 27, 2014", 6 pgs.
"U.S. Appl. No. 14/284,935, Non Final Office Action mailed Mar. 25, 2015", 4 pgs.
"U.S. Appl. No. 14/284,935, Non Final Office Action mailed Aug. 6, 2014", 7 pgs.
"U.S. Appl. No. 14/284,935, Response filed Aug. 19, 2014 to Non Final Office Action mailed Aug. 6, 2014", 8 pgs.
"U.S. Appl. No. 14/284,935, Response filed Dec. 22, 2014 to Final Office Action mailed Oct. 27, 2014", 4 pgs.
"Avast! Distributed Network Manager", [Online]. Retrieved from the Internet: <URL: http://web.archive.org/web/20040612065805/http://www.avast.com/i_idt_168.html, (Jun. 12, 2004), 5 pgs.
"Barracuda Web Filter Administrators Guide Version 3.0", Barracuda Networks, (2004-2007), 86 pgs.
"Blended Threats: Case Study and Countermeasures. White Paper.", Symantec Enterprise Security, (2001), 16 pgs.
"Centrax Version 3.0 User's Guide", Cybersafe Corporation, (Feb. 2001), 180 pgs.
"Check Point SmartUpdate", [Online]. Retrieved from the Internet: <URL: http://web.archive.org/web/2003 020 5084611/http://www.checkpoint.com/products/manage/smartupdate.html, (Accessed Mar. 20, 2015), 9 pgs.
"Comparison chart of Symantec Virus Protection and Content Filteringt Products", Symantec Corporation, (2003), 2 pgs.
"Comprehensive Intrusion Protection Solutions from Symantec: Secure enterprise assets and applications with advanced intrusion protection", Symantec Corporation, (2003), 8 pgs.
"Concepts & Examples Guide Netscreen—IDP Fundamentals", Version 2.1. Chapters 1-4, (2003), 1-126.
"Concepts & Examples Guide NetScreen—IDP Fundamentals—Version 2.1", NetScreen Technologies. Chapter 1-5, (2003), 1-126.
"Concepts & Examples Guide NetScreen—IDP Fundamentals—Version 3.0", Juniper Networks. Chapters 1-7, (2004), 1-164.
"Content Filtering Service-Standard Administrator's Guide", SonicWALL Inc., (2008), 30 pgs.
"Content Filtering, Blocking and Network Management", K12USA.com Service Demos, [Online]. Retrieved from the Internet: <URL: http:l/web.archive.org/web/2003051 0 195438/http :1 lkl2usa.com/sademo6.asp>, (May 10, 2003), 1 pg.
"Enhanced Dynamic Threat Protection via Automated Correlation and Analysis (An ISS White Paper)", Internet Security Systems, (2002), 1-14.
"Enterasys Dragon—EALTM Intrusion Defense System Security Target Version 11", Enterasys Networks, (Aug. 31, 2004), 79 pgs.
"ePolicy Ochestrator version 3.0—Installation Guide Revision 1.0", McAfee, (2003), 108 pgs.
"ePolicy Orchestrator Small Business Edition version 3.0—Getting Started Guide", McAfee, (2003), 52 pgs.

"Exhibit A-1, U.S. Pat. No. 8,056,135, Invality Claim Chart based on U.S. Pat. No. 6,484,315 to Ziese", (Mar. 2, 2015), 1-27.
"Exhibit A-10, U.S. Pat. No. 8,056,135, Invalidity Claim Chart based on U.S. Pat. No. 7,992,142 to Hartshorne et al.", (Mar. 2, 2015), 1-9.
"Exhibit A-2, U.S. Pat. No. 8,056,135, Invalidity Claim Chart based on U.S. Pat. No. 6,782,527 to Kouznetsov", (Mar. 2, 2015), 1-26.
"Exhibit A-3, U.S. Pat. No. 8,056,135, Invalidity Claim Chart based on U.S. Pat. No. 7,577,721 to Chen", (Mar. 2, 2015), 1-21.
"Exhibit A-4, U.S. Pat. No. 8,056,135, Invalidity Claim Chart based on Jun Li et al., Resilient Self-Organizing Overlay Networks for Secutiry Update Delivery, 22 IEEE Journal on Selected Areas Communications 189 (Jan. 2004)", (Mar. 2, 2015), 1-32.
"Exhibit A-5, U.S. Pat. No. 8,056,135, Invality Claim Chart based on Fortinet Prior Art System", (Mar. 2, 2015), 1-65.
"Exhibit A-6, U.S. Pat. No. 8,056,135, Invalidity Claim Chart based on Symantec Prior Art System", (Mar. 2, 2015), 1-53.
"Exhibit A-7, U.S. Pat. No. 8,056,135, Invalidity Claim Chart based on the McAfee Prio Art System", (Mar. 2, 2015), 1-67.
"Exhibit A-8, U.S. Pat. No. 8,056,135, Invalidity Claim Chart based on Trend Micro Prior Art System", (Mar. 2, 2015), 1-38.
"Exhibit A-9, U.S. Pat. No. 8,056,135, Invality Claim Chart based on U.S. Pat. No. 8,108,429 to Sim-tang et al.", (Mar. 2, 2015), 1-37.
"Exhibit B-1, U.S. Pat. No. 8,276,205, Invalidity Claim Chart based on U.S. Pat. No. 6,484,315 to Ziese", (Mar. 2, 2015), 1-43.
"Exhibit B-2, U.S. Pat. No. 8,276,205, Invalidity Claim Chart based on U.S. Pat. No. 6,782,527 to Kouznetsov", (Mar. 2, 2015), 1-40.
"Exhibit B-3, U.S. Pat. No. 8,276,205, Invalidity Claim Chart based on U.S. Pat. No. 7,577,721 to Chen", (Mar. 2, 2015), 1-35.
"Exhibit B-4, U.S. Pat. No. 8,276,205, Invalidity Claim Chart based on Jun Li et al., Resilient Self-Organizing Overlay Networks for Security Update Delivery, 22 IEEE Journal on Selected Areas Communications 189 (Jan. 2004)", (Mar. 2, 2015), 1-43.
"Exhibit B-5, Part 1, U.S. Pat. No. 8,276,205, Invalidity Claim Chart based on the Fortinet Prior Art System", (Mar. 2, 2015), 1-44.
"Exhibit B-6, U.S. Pat. No. 8,276,205, Invalidity Claim Chart based on Symantec Prior Art System", (Mar. 2, 2015), 1-61.
"Exhibit B-7, U.S. Pat. No. 8,276,205, Invalidity Claim Chart based on the McAfee Prior Art System", (Mar. 2, 2015), 1-62.
"Exhibit B-8, U.S. Pat. No. 8,276,205, Invalidity Claim Chart based on Trend Micro Prior Art System", (Mar. 2, 2015), 1-45.
"Exhibit B-9, U.S. Pat. No. 8,276,205, Invalidity Claim Chart based on U.S. Pat. No. 8,108,429 to Sim-tang et al.", (Mar. 2, 2015), 1-50.
"Exhibit C-1, U.S. Pat. No. 8,051,483, Invalidity Claim Chart based on U.S. Pat. No. 6,484,315 to Ziese", (Mar. 2, 2015), 1-43.
"Exhibit C-2, U.S. Pat. No. 8,051,483, Invalidity Claim Chart based on U.S. Pat. No. 6,782,527 to Kouznetsov", (Mar. 2, 2015), 1-41.
"Exhibit C-3, U.S. Pat. No. 8,051,483. Invalidity Claim Chart based on U.S. Pat. No. 7,577,721 to Chen", (Mar. 2, 2015), 1-37.
"Exhibit C-4, U.S. Pat. No. 8,051,483, Invalidity Claim Chart based on Jun Li et al., Resilient Self-Organizing Overlay Networks for Security Update Delivery, 22 IEEE Journal on Selected Areas Communications 189 (Jan. 2004)", (Mar. 2, 2015), 1-39.
"Exhibit C-5, U.S. Pat. No. 8,051,483, Invalidity Claim Chart based on the Fortinet Prior Art System", (Mar. 2, 2015), 1-64.
"Exhibit C-6, U.S. Pat. No. 8,051,483, Invalidity Claim Chart based on the Symantec Prior Art System", (Mar. 2, 2015), 1-33.
"Exhibit C-7, U.S. Pat. No. 8,051,483, Invalidity Claim Chart based on the McAfee Prior Art System", (Mar. 2, 2015), 1-37.
"Exhibit C-8, U.S. Pat. No. 8,051,483, Invalidity Claim Chart based on the Trend Micro Prior Art System", (Mar. 2, 2015), 1-39.
"Exhibit C-9, U.S. Pat. No. 8,051,483, Invalidity Claim Chart based on U.S. Pat. No. 8,108,429 to Sim-tang et al.", (Mar. 2, 2015), 1-45.
"Exhibit D-1, U.S. Pat. No. 7,580,974, Invalidity Claim Chart based on U.S. Pat. No. 6,651,099 to Dietz et al.", (Mar. 2, 2015), 1-21.
"Exhibit D-2, U.S. Pat. No. 7,580,974, Invalidity Claim Chart based on U.S. Pat. No. 7,600,257 to Dubrovsky et al.", (Mar. 2, 2015), 1-18.
"Exhibit D-3, U.S. Pat. No. 7,580,974, Invalidity Claim Chart based on U.S. Pat. No. 7,292,531 to Hill", (Mar. 2, 2015), 1-20.
"Exhibit D-4, U.S. Pat. No. 7,580,974, Invalidity Claim Chart based on U.S. Pat. No. 7,664,048 to Yung", (Mar. 2, 2015), 1-25.

(56) References Cited

OTHER PUBLICATIONS

"Exhibit D-5, U.S. Pat. No. 7,580,974, Invalidity Claim Chart based on U.S. Patent Publication 2002/0009079 to Jungck et al.", (Mar. 2, 2015), 1-21.
"Exhibit D-6, U.S. Pat. No. 7,580,974, Invalidity Claim Chart based on U.S. Pat. No. 7,681,032 to Paled et al.", (Mar. 2, 2015), 1-28.
"Exhibit D-7, U.S. Pat. No. 7,580,974, Invalidity Claim Chart based on U.S. Pat. No. 7,760,722 to Tripathi et al.", (Mar. 2, 2015), 1-18.
"Exhibit D-8, U.S. Pat. No. 7,580,974, Invalidity Claim Chart based on U.S. Pat. No. 7,639,613 to Ghannadian et al.", (Mar. 2, 2015), 1-23.
"Exhibit E-1, U.S. Pat. No. 8,204,933, Invalidity Claim Chart based on U.S. Pat. No. 6,651,099 to Dietz et al.", (Mar. 2, 2015), 1-37.
"Exhibit E-2, U.S. Pat. No. 8,204,933, Invalidity Claim Chart based on U.S. Pat. No. 7,600,257 to Dubrovsky et al.", (Mar. 2, 2015), 1-24.
"Exhibit E-3, U.S. Pat. No. 8,204,933, Invalidity Claim Chart based on U.S. Pat. No. 7,292,531 to Hill", (Mar. 2, 2015), 1-26.
"Exhibit E-4, U.S. Pat. No. 8,204,933, Invalidity Claim Chart based on U.S. Pat. No. 7,664,048 to Yung", (Mar. 2, 2015), 1-32.
"Exhibit E-5, U.S. Pat. No. 8,204,933, Invalidity Claim Chart based on U.S. Patent Publication 2002/0009079 to Jungck et al", (Mar. 2, 2015), 1-26.
"Exhibit E-6, U.S. Pat. No. 8,204,933, Invalidity Claim Chart based on U.S. Pat. No. 7,681,032 to Paled et al.", (Mar. 2, 2015), 1-32.
"Exhibit E-7, U.S. Pat. No. 8,204,933, Invalidity Claim Chart based on U.S. Pat. No. 7,760,722 to Tripathi et al.", (Mar. 2, 2015), 1-27.
"Exhibit E-8, U.S. Pat. No. 8,204,933, Invalidity Claim Chart based on U.S. Pat. No. 7,639,613 to Ghannadian et al.", (Mar. 2, 2015), 1-26.
"Exhibit F-1, U.S. Pat. No. 7,979,543, Invalidity Claim Chart based on the MINDS Prior Art System.", (Mar. 2, 2015), 1-26.
"Exhibit F-10, U.S. Pat. No. 7,979,543, Invalidity Claim Chart based on U.S. Pat. No. 6,161,130 to Horvitz", (Mar. 2, 2015), 1-27.
"Exhibit F-11, U.S. Pat. No. 7,979,543, Invalidity Claim Chart based on U.S. Pat. No. 7,774,839 to Nazzal", (Mar. 2, 2015), 1-27.
"Exhibit F-12, U.S. Pat. No. 7,979,543, Invalidity Claim Chart based on U.S. Pat. No. 7,379,993 to Valdes", (Mar. 2, 2015), 1-24.
"Exhibit F-13, U.S. Pat. No. 7,979,543, Invalidity Claim Chart based on Brin", (Mar. 2, 2015), 1-20.
"Exhibit F-14, U.S. Pat. No. 7,979,543, Invalidity Claim Chart based on WO 01/55905 to Kessinger et al.", (Mar. 2, 2015), 1-20.
"Exhibit F-15, U.S. Pat. No. 7,979,543, Invalidity Claim Chart based on U.S. Pat. No. 7,814,089 to Skrenta et al.", (Mar. 2, 2015), 1-18.
"Exhibit F-2, U.S. Pat. No. 7,979,543, Invalidity Claim Chart based on the Arbor Networks System", (Mar. 2, 2015), 1-31.
"Exhibit F-3, U.S. Pat. No. 7,979,543, Invalidity Claim Chart based on the McAfee Prior Art System", (Mar. 2, 2015), 1-40.
"Exhibit F-4, U.S. Pat. No. 7,979,543, Invalidity Claim Chart based on NetScreen Prior Art System", (Mar. 2, 2015), 1-47.
"Exhibit F-5, U.S. Pat. No. 7,979,543, Invalidity Claim Chart based on the Symantec Prior Art System", (Mar. 2, 2015), 1-31.
"Exhibit F-6, U.S. Pat. No. 7,979,543, Invalidity Claim Chart based on U.S. Pat. No. 7,725,544 to Alspector", (Mar. 2, 2015), 1-29.
"Exhibit F-7, U.S. Pat. No. 7,979,543, Invalidity Claim Chart based on U.S. Pat. No. 7,320,020 to Chadwick", (Mar. 2, 2015), 1-23.
"Exhibit F-8, U.S. Pat. No. 7,979,543, Invalidity Claim Chart based on U.S. Pat. No. 8,046,832 to Goodman", (Mar. 2, 2015), 1-29.
"Exhibit F-9, U.S. Pat. No. 7,979,543, Invalidity Claim Chart based on U.S. Pat. No. 6,088,804 to Hill", (Mar. 2, 2015), 1-27.
"Exhibit G, Prior Art References Relevant to the '135 Patent, '205 Patent, and the '483 Patent", (Mar. 2, 2015), 1-27.
"F-Secure Anti-Virus 5 Win 95/98/ME/NT4.0/2000/XP DOS Administrators Guide", F-Secure Corporation, (1996), 113 pgs.
"FireEye's Disclosure of Invalidity Contentions", *Fortinet, Inc.* v. *FireEye, Inc.*, US District Court of Northern District of California, San Franciso Division, Case No. 5:13-cv-02496-HSG-PSG, (Mar. 2, 2015), 38 pgs.
"FortiGate—3600 User Manual Part 1", Fortinet, (2003), 1-168.
"FortiResponse Update Infrastructure", Fortinet, (2002), 10 pgs.
"Hardware Guide NetScreen—IDP V/N 2.1", NetScreen Technologies, (2003), 114 pgs.
"High Availability QuickStart Guide IDP 100 & 500", NetScreen Technologies Inc., (2003), 32 pgs.
"How to determine whether virus definitions on a NetWare server are up to date without using Symantec System Center. Article ID:TECH99403", Symantec Corporation, (2007), 2 pgs.
"Implementation Guide—Version 2.0", NetScreen Technologies, (2002), 106 pgs.
"Implementing Trend Micro antivirus solutions in the Enterprise", SANS Institute, (2003), 18 pgs.
"Intelligent Network Management with Peakflow Traffic", Arbor Networks, Inc., (2003), 14 pgs.
"Intruder Alert 3.6: Host-Based Intrusion Detection and Security Policy Management", Symantec Corporation, (2001), 2 pgs.
"Intrushield IPS Quick Reference Card", McAfee, (2008), 2 pgs.
"Intrusion Detection Systems: Symantec ManHunt—Reducing the Risk of Compromise", Symantec corporation, (2003), 16 pgs.
"LiveUpdate Administrator's Guide. Documentatoin Version 1.8", Symantec Corporation, (2002), 65 pgs.
"Managed Virus Defense ASaP", Network Associates, (2003), 1 pg.
"Managing Security Incidents in the Enterprise. White paper", Symantec Corporation, (2002), 12 pgs.
"ManHunt: FAQ", Recourse Technologies, [Online]. Retrieved from the Internet: <URL: http:/ /web.archive.org/web/200 104300 12831/http:/ /www.recourse.com/products/manhunt . . . >, (Apr. 30, 2001), 2 pgs.
"McAfee AutoUpdate Architect version 1.1.1—Product Guide Revision 1.0", McAfee, (2003), 80 pgs.
"McAfee AVERT Launches Webimmune to Deliver Real-Time Cures for New Viruses Via the Internet; McAfee AVERT Webimmune Offers E-businesses Immediate Cures for the Newest Internet Viruses and Malicious Code Attacks", LexisNexis, (Sep. 20, 2000), 3 pgs.
"McAfee IntruShield IPS—Intrushield Security Manager (ISM) version 4.1—Alerts & System Health monitoring Guide revision 5.0", McAfee, (2008), 116 pgs.
"McAfee IntruShield IPS—IntruShield Security Manager (ISM) version 4.1—Policies Configuration guide revision 4.0", McAfee, (2007), 96 pgs.
"McAfee IntruShield IPS—McAfee IntruShield Security Manager (ISM) version 4.1—Manager Server configuration Guide revision 5.0", McAfee, (2008), 88 pgs.
"McAfee IntruShield IPS—McAfee IntruShield Security Manager (ISM) version 4.1—Intrushield Quick Tour revision 4.0", McAfee, (2007), 36 pgs.
"McAfee Intrushield IPS Attack Description version 4.1—Intrushield Attack Description Guide revision 1.0", McAfee, (2007), 14 pgs.
"McAfee IntruShield IPS Intrushield Security Manager (ISM) version 4.1—Intrushield Getting Started Guide revision 7.0", McAfee, (2009), 85 pgs.
"McAfee IntruShield IPS IntruShield Sensor 4000 version 4.1—Intrushield Sensor 4000 Product Guide revision 7.0", McAfee, (2008), 35 pgs.
"McAfee IntruShield Network IDS Sensor—Data Sheet", McAfee, (2003), 6 pgs.
"McAfee IntruShield Network IPS Sensor—Industry-Leading, Next Generation Network Intrusion Prevention Solution (Data Sheet)", McAfee, (2004), 8 pgs.
"McAfee Intrushield Security Management", McAfee, (2004), 7 pgs.
"McAfee IntruShield Security Management—Data Sheet", McAfee, (2003), 6 pgs.
"McAfee VirusScan Home Edition Version 7.0—Product Guide", McAfee, (2002), 48 pgs.
"McAfee WebShield c500 Appliance", McAfee, (2001), 2 pgs.
"NETASQ IPS—Firewalls Version 6.0", NETASQ Secure Internet Connectivity, (2004), 16 pgs.
"NetScreen IDP Concepts Guide—Version 2.0", NetScreen Technologies, (2002), 170 pgs.

(56) References Cited

OTHER PUBLICATIONS

"NetScreen IDP Hardware Information Guide—Version 2.0", NetScreen Technologies, (2002), 52 pgs.
"NetScreen—Global PRO Security Management Systems", NetScreen Technologies Inc., (2003), 8 pgs.
"NetScreen—5000 Series", NetScreen Technologies, (2003), 4 pgs.
"NetScreen—IDP Release Notes", NetScreen Technologies, (Mar. 25, 2004), 16 pgs.
"NetSpective Solutions White Paper", Verso Technologies, (Jul. 2003), 1-12.
"Network Appliance, now from Symantec", Recourse Technologies, (2002), 2 pgs.
"Norton AntiVirus for use with ePolicy Orchestrator version 3.0, version 7.50, 7.51, 7.6, 8.0 and 8.01—Configuration Guide Revision 1.0", McAfee, (2003), 48 pgs.
"Packeteer's PacketShaper", Packeteer, Inc., (2004), 4 pgs.
"Peakflow X: Internal Network Security for Mission-Critical Networks", Arbor Networks, Inc., (2004), 4 pgs.
"Peakflow X: Over the past few years, large enterprises have significantly improved the security of the network perimeter. However, despite those investments, most networks remain vulnerable at their core.", Arbor Networks, Inc., (2003), 4 pgs.
"Product Deployment Comparison", McAfee Security, (2003), 2 pgs.
"Quickstart Guide IDP 10, 100, 500 & Bypass Unit Version 2.1", NetScreen Technologies Inc., (2003), 28 pgs.
"Quickstart Guide IDP 100, Version 2.0", NetScreen Technologies Inc., (2002), 24 pgs.
"Real Time Network Protection for Educational Institutions", Fortinet, (Feb. 2003), 14 pgs.
"Release Notes for McAfee ePolicy Orchestrator (TM) Version3.0. 0", McAfee, (2003), 43 pgs.
"Service Provider Infrastructure Security: Detecting, Tracing, and Mitigating Network-Wide Anomalies with Peakflow DoS", Arbor Networks, Inc., (2003), 14 pgs.
"SmartCOP Anti-Virus Corporate Edition", [Online]. Retrieved from the Internet: <URL: http:/ /web .archive.org/web/2004040 1193806/http:/ /www.s-cop.com/LAN -scop-features.html, (Accessed Mar. 20, 2015), 4 pgs.
"SonicWALL Intrusion Prevention Service 2.0, Administrators Guide", SonicWALL, (2005), 1-38.
"SonicWALL Intrusion Prevention Service Administrators Guide", SonicWALL, Inc., (2004), 81 pgs.
"Symantec AntiVirus™ Corporate Edition Administrators Guide and Reference Guide. Documentation version 9.0", Symantec Corporation, (2004), 258 pgs.
"Symantec AntiVirus™ Corporate Edition Administrators Guide. Document version 9.0.", Symantec Corporation, (2004), 216 pgs.
"Symantec AntiVirus™ Corporate Edition Reference Guide. Documentation version 8.1", Symantec Corporation, (2003), 42 pgs.
"Symantec Central Quarantine Administrator's Guide", Symantec Corporation, (2001), 81 pgs.
"Symantec Client Security with Event Manager: Integrated antivirus, firewall, and intrusion detection for the client with centralizedc logging, alerting, and reporting", Symantec Corporation, (2003), 4 pgs.
"Symantec Corporation: Feature and Usage Comparison of the Sumantec Gateway Security Appliance : Test report prepared under contract from Symantec Corporation", Symantec Corporation, (Dec. 2002), 1-33.
"Symantec Decoy Server 3.1", Symantec Corporation, (2003), 2 pgs.
"Symantec Enterprise Product Catalog", Symantec Corporation, (2003), 16 pgs.
"Symantec Enterprise Security Manager: Comprehensive Policy and Compliance Management", Symantec Corporation, (2003), 2 pgs.
"Symantec Event Manager for Intrusion Protection: Centralized monitoring, alerting, and reporting for Symantec and select third-party intrusion detection and intrusion prevention solutions", Symantec Corporation, (2003), 2 pgs.
"Symantec Event Manager for Security Gateways: Centralized logging, alerting, and reporting across Symantec's security gateway protection solutions and select third-party products", Symantec Corporation, (2003), 2 pgs.
"Symantec Gateway Security 5400 Series: Full-inspection firewall appliance with integrated security technologies", Symantec Corporation, (2003), 4 pgs.
"Symantec Gateway Security: Symantec introduces the answer to attacks like Nimda, Code Red and other blended threats Blended security:", Symantec Corporation, (2002), 7 pgs.
"Symantec Host IDS: Automated intrusion detection and response for systems, applications, and data", Symantec Corporation, (2002), 2 pgs.
"Symantec Incident Manager: Real-time security incident management for enterprise network environments", Symantec Corporation, (2003), 4 pgs.
"Technical Brief—Cisco Secure Intrusion Detection System Technical Overview", Cisco Systems, Inc., [Online]. Retrieved from the Internet: <URL: http:/ /web.archive.org/web/2000 10 18195620/ http:/ /www.cisco.com/warp/public/cc/pd/sq . . . >, (Oct. 18, 2000), 8 pgs.
"The Digital Immune System: Enterprise-Grade Anti-Virus Automation in the 21st Century", Symantec Corporation, (2001), 16 pgs.
"Trend Micro ServerProtect 5.31 for EMC Celerra Evaluation Guide", Trend Micro Inc., (Sep. 2001), 36 pgs.
"Updating with VirusScan Enterprise Version 7.0 Document Revision 1.0—Implementation Guide", McAfee Security, (2003), 44 pgs.
"Updating with VirusScan Enterprise. Version 7.0.—Implementation Guide", McAfee Security, (Mar. 2003), 44 pgs.
"Using Management Center for Cisco Security Agents 4.0", Chapters 1-4. Cisco Systems, Inc., (2003), 1-190.
"VirusScan® Enterprise. Version 7.1.0—Product Guide, Revision 1.0", Chapters 6-8, plus Appendices, Glossary and Index. McAfee Security, (Sep. 2003), 149-290.
"VirusScan ASaP Desktop AntiVirus without the management headache", Network Associates, (2003), 2 pgs.
"VirusScan ASaP FAQ", Network Associates, (2003), 1 pg.
"VirusScan ASaP Features and Benefits", Network Associates, (2003), 2 pgs.
"VirusScan Enterprise version 7.1.0—Product Guide Revision 1.0", Chapters 1-5. McAfee, (2003), 1-148.
"WatchGuard LiveSecurity System User Guide", Chapters 1-14. WatchGuard Technologies, Inc., LiveSecurity System 4.1, (1998-2000), 1-178.
"WebShield e500 Appliance Product Guide Version 2.0", McAfee, (2001), 52 pgs.
Andersen, David, et al., "Resilient Overlay Networks", Proceedings of the eighteenth ACM symposium on Operating systems principles, (Oct. 21, 2001), 15 pgs.
Bace, Rebecca, et al., "NIST Special Publication on Intrusion Detection Systems", Booz-Allen and Hamilton Inc., (2001), 53 pgs.
Barry, R L, et al., "Mulifractal Characterzation for Classification of Network Traffic", Proceedings ICCECE-CCGEI, vol. IV, (2004), 1453-1457.
Bhattacharyya, Manasi, et al., "MET: An Experimental System for Malicious Email Tracking", New Security Paradigms Workshop, (2002), 3-10.
Bhola, Sumeer, et al., "Exactly-once Delivery in a Content-based Publish-Subscribe System", Dependable Systems and Networks, 2002. DSN 2002. Proceedings. International Conference, (2002), 10 pgs.
Boniforti, Christian, "Securing a University's Bandwidth with PacketShaper. Version 1.4b, Option B", SANS Institute. Global Information Assurance Certification Paper, (Mar. 2003), 31 pgs.
Brin, Sergey, et al., "The Anatomy of a Large-Scale Hypertextual Web Search Engine", Elsevier Science Publisher, (1998), 24 pgs.
Chalak, Ashok, et al., "Effective Data Mining Techinques for Intrusion Detection and Prevention System", UACEE International Journal of Advances in Computer Networks and its Security, (2011), 286-290.

(56) References Cited

OTHER PUBLICATIONS

Chandola, Varun, et al., "Data Mining for Cyber Security", Data Warehousing and Data Mining Techniques for Computer Security, (2006), 20 pgs.

Chen, Yao-Min, et al., "Policy management for network-based intrusion detection and prevention", Network Operations and Management Symposium, 2004. NOMS 2004. IEEE/FIP vol. 2, (Apr. 23, 2004), 218-232.

Choi, TS, et al., "Content-Aware Internet Application Traffic Measurement and Analysis", Network Operations and Management Symposium, 2004. NOMS 2004. IEEE/IFIP. vol. 1, (2004), 511-524.

Cohn, David, et al., "Semi-supervised Clustering with User Feedback", Cornell University, (2003), 9 pgs.

Cooley, AL, "Using Integrated Security Platforms to Improve Network Security and Reduce Total Cost of Ownership", Astaro Internet Security, (Oct. 24, 2003), 14 pgs.

Davison, Brian D., "Topical Locality in the Web", Department of Computer Science Rutgers, The State University of New Jersey, (2000), 272-279.

De Rijk, Mark, "Use offense to inform defense. Find flaws before the bad guys do. Case study: Implementing Trend Micro antivirus solutions in the enterprise.", SANS Penetration Testing, (Nov. 2002), 18 pgs.

Debar, Nerve, et al., "Aggregation and Correlation of Intrusion-Detection Alerts", IBM Research, Zurich Research Laboratory, (2001), 87-105.

Dokas, Paul, et al., "Data Mining for Network Intrusion Detection", Proc. NSF Workshop on Next Generation Data Mining, (2002), 21-30.

Dumais, Susan, et al., "Hierarchical Classification of Web Content", Proceedings of the 23rd annual international ACM SIGIR conference on Research and development in information retrieval, (2000), 256-263.

Ertoz, L., et al., "Detection and Summarization of Novel Network Attacks Using Data Mining", AHPCRC Technical Report, (2003), 23 pgs.

Ertoz, Levent, et al., "Detection of Novel Network Attacks Using Data Mining", Computer Science Department, University of Minnesota, (Jan. 26, 2015), 10 pgs.

Ertoz, Levent, et al., "MINDS—Minnesota Intrusion Detection System", Chapter 3, (2003), 21 pgs.

Ester, Martin, et al., "Web Site Mining : A new way to spot Competitors, Customers and Suppliers in the World Wide Web", SIGKDD, (2002), 249-258.

Eugster, Patrick T., "The Many Faces of Publish/Subscribe", ACM Computing Surveys, 35(2), (Jun. 2003), 114-131.

Fisk, Mike, et al., "Fast Content-Based Packet Handling for Intrusion Detection", UCSD Technical Report CS2001-0670, (May 2001), 1-14.

Freed, Les, "Corporate Antivirus: Germ Warfare at Work", PC Magazine, (May 9, 2000), 7 pgs.

Gong, Dr. Fendmim, "Next Generation Intrusion Detection Systems (IDS)", McAfee Security, (Mar. 2002), 16 pgs.

Gong, Fengmin, "Next Generation Intrusion Detection systems (IDS)", Network Associates, (Mar. 2002), 16 pgs.

Gupta, Manish, et al., "Intrusion Countermeasures Secutiry Model Based on Prioritization Scheme for Intranet Access Security (Emerging Concepts Category)", Proceedings of the 2003 IEEE Workshop on Information Assurance, (2003), 174-181.

Gupta, P., et al., "Packet Classification on Multiple Fields", Proceedings of the Conference on Applications, Technologies, Architectures, and Protocols for Computer Communication (ACM SIGCOMM '99), (1999), pp. 147-160.

Gupta, Pankaj, et al., "Algorithms for Packet Classification", IEEE Network, (Mar. 2001), 29 pgs.

Haas, Norman, et al., "Personalized News Through Content Augmentation and Profiling", IEEE, Paper 238, (2002), 5 pgs.

Hauswirth, Manfred, et al., "A Component and Communication Model for Push Systems", Proceedings of the 7th European software engineering conference held jointly with the 7th ACM SIGSOFT International symposium on Foundations of software engineering, (1999), 38 pgs.

Hoffmeyr, Steven, "An Immunological Model of Distributed Detection and Its Application to Computer Security", University of Witwatersrand, (May 199), 135 pgs.

Jackson, Kathleen, "Intrusion Detection System (IDS) Product Survey. Version 2.1", Distributed Knowledge Systems Team Computer Research and Applications Group Computing, Information, and Communications Division Los Alamos National Laboratory Los Alamos, New Mexico, (Jun. 25, 1999), 106 pgs.

Jungck, Peder, et al., "Computing Practices: Issues in High-Speed Internet Security", Published by the IEEE Computer Society, (Jul. 2004), 36-42.

Karagiannis, Thomas, et al., "Transport Layer Identifcation of P2P Traffic", IMC, (2004), 14 pgs.

Kephart, Jeffrey, et al., "Automatic Extraction of Computer Virus Signatures", In Proceedings of the 4th Virus Bulletin International Conference, R. Ford, ed., Virus Bulletin Ltd., (1994), 179-194.

Kreibich, Christian, et al., "Honeycomb—Creating Intrusion Detection Signatures Using Honeypots", ACM SIGCOMM Computer Communications Review, vol. 34, No. 1, (Jan. 2004), 51-56.

Lakshminarayanan, Karthik, et al., "Algorithms for Advanced Packet Classification with Ternary CAMS", SIGCOMM, (2005), 193-204.

Lee, Wenke, et al., "A Framework for Constructing Features and Models for Intrusion Detection Systems", ACM Transactions on Information and System Security, vol. 3, No. 4 (Nov. 2000), 227-261.

Li, Jun, et al., "Resilient Self-Organizing Overlay Networks for Security Update Delivery", IEEE Journal on Selected Areas in Communications (vol. 22, No. 1), (Jan. 1, 2004), 14 pgs.

Lockwood, John, et al., "An Extensible, System-On-Programmable-Chip, Content-Aware Internet Firewall", 13th International Conference, FPL, Lecture Notes in Computer Science vol. 2778,, (2003), 859-868.

Lonvick, C, "Network Working Group Request for Comments: 3164 Category: Informational: The BSD syslog Protocol", Cisco Systems, (Aug. 2001), 30 pgs.

Lynxwiler, Rodney, "Implementing a Norton AntiVirus Managed Infrastructure", Symantec Corporate, (2002), 13 pgs.

Ma, Pingchuan, "Log Analysis-Based Intrusion Detection via Unsupervised Learning", School of Informatics University of Edinburgh, (2003), 1-70.

Malan, G. Robert, et al., "Salamander: A Push-based Distribution Substrate for Internet Applications", USENIX Symposium on Internet Technologies and Systems, (Dec. 1997), 12 pgs.

Malkin, Gary, "RIP Version 2", Network Working Group. Request for Comments: 2453, (Nov. 1998), 1-39.

Maselli, Gaza, et al., "Design and Implementation of an Anomaly Detection System: an Emperical Approach", TERENA Networking Conference, (2003), 1-20.

Merrick, David, "Hardware Flow Classification's Potential Impact on Security-in-Depth Design. GSEC Practical Version 1.3", SANS Institute. Global Information Assurance Certification Paper, (Apr. 15, 2002), 12 pgs.

Moore, Andrew, et al., "Toward the Accurate Identification of Network Applications", Passive and Active Network Measurement. 6th International Workshop, PAM, (2005), 15 pgs.

Nachenberg, Carey, "Computer Virus—Coevolution", Communications of the ACM vol. 40 No. 1, (Jan. 1997), 46-51.

Nakayama, Takehiro, "Content-Oriented Categorization of Document Images", COLING '96 Proceedings of the 16th conference on Computational linguistics, vol. 2, (1996), 818-823.

Neubauer, Bruce J, et al., "Protection of computer systems from computer viruses: ethical and practical issues", Journal of Computing Sciences in Colleges, vol. 18, No. 1, (Oct. 2002), 270-279.

Noel, Steven, et al., "Modern Intrusion Detection, Data Mining, and Degrees of Attack Guilt", Applications of Data Mining in Computer Security, vol. 6., Kluwer Academic Publishers, (2002), 1-31.

Noel, Steven, et al., "Optimal IDS Sensor Placement and Alert Prioritization Using Attack Graphs", JNSM, vol. 16, Issue 3, (2008), 1-15.

(56) References Cited

OTHER PUBLICATIONS

Northcutt, Stephen, et al., "Chapter 3: Stateful Firewalls", Inside Network Perimeter Security, 2nd Edition, Pearson, (2005), 55-86.

Oveissian, A, et al., "Fast Flow Classification over Internet", Proceedings of the Second Annual Conference on Communication Networks and Services Research, (2004), 8 pgs.

Pietzuch, Peter R., et al., "Hermes: A Distributed Event-Based Middleware Architecture", Distributed Computing Systems Workshops, 2002. Proceedings. 22nd International Conference, (2002), 8 pgs.

Rabek, Jesse, et al., "Detecting Privilege-Escalating Executable Exploits", In ICDM Workshop on Data Mining for Computer Security, (2003), 1-7.

Radcliff, Deborah, "The Evolution of IDS", Network World, (Nov. 8, 2004), 4 pgs.

Rigney, Steve, "Network Antivirus: Defend Your Network", PC Magazine, (May 4, 1999), 4 pgs.

Roeckl, Chris, "Stateful Inspection Firewalls: An Overview of Firewall Technology and How Juniper Networs Implements it. White Paper", (2004), 1-14.

Roughan, Matthew, et al., "Class-of-Service Mapping for QoS: A Statistical Signature-based Approach to IP Traffic Classification", IMC, (2004), 135-148.

Salvatore, J, et al., "Combining Behavior Models to Secure Email Systems", CU Tech Report, (May 16, 2003), 1-14.

Salvatore, J, et al., "Detecting Viral Propagations Using Email Behavior Profiles", ACM Transactions on Internet Technology, (2006), 47 pgs.

Schultz, Matthew, et al., "Data Mining Methods for Detection of New Malicious Executables", Proceedings of the 2001 IEEE Symposium on Security and Privacy, (2001), 38-49.

Schultz, Matthew, "Data Mining Methods for Detection of New Malicious Executables", Proceedings of the 2001 IEEE Symposium on Security and Privacy, (2001), 1-14.

Srinivasan, V., et al., "Packet Classification Using Tuple Space Search", Proceedings of the Conference on Applications, Technologies, Architectures, and Protocols (ACM SIGCOMM '99), (1999), pp. 135-146.

Subramanya, S. R., et al., "Computer Viruses", Potentials, IEEE vol. 2, No. 4, (Oct./Nov. 2001), 16-19.

Wenjie, Hu, "Robust Anomaly Detection Using Support Vector Machines", ICML, (2003), 1-8.

Wespi, Andreas, "Lecture Notes in Computer Science 2516—Part 1 Recent Advances in Intrusion Detection", 5th International Symposium, RAID 2002, (Oct. 2002), 1-157.

Wu, Yu-Sung, et al., "SCIDIVE: A Stateful and Cross Protocol Intrusion Detection Architecture for Voice-over-IP Environments", Proceedings of the 2004 International Conference on Dependable Systems and Networks (DSN'04) Washington, DC, USA: IEEE Computer Society, (2004), 10 pgs.

Zander, Sebastian, et al., "Automated Traffic Classification and Application Identification using Machine Learning", Proceedings of the IEEE Conference on Local Computer Networks 3oth Anniversary, (2005), 8 pgs.

"U.S. Appl. No. 14/284,935, filed Jun. 24, 2015 to Non Final Office Action mailed Mar. 25, 2015", 10 pgs.

* cited by examiner

| TESTS | ACCURACY | CONTENT CHARACTERIZATION |
|---|---|---|
| ILA | 10% | PORNO |
| ELA | 20% | EDUCATIONAL |
| MTA | 40% | PORNO |
| TKA | 30% | NEWS |

SYSTEMS AND METHODS FOR CATEGORIZING NETWORK TRAFFIC CONTENT

RELATED APPLICATION DATA

This application is a Continuation of U.S. application Ser. No. 14/284,935, filed on May 22, 2014; which is a Continuation of U.S. application Ser. No. 13/795,390, filed on Mar. 12, 2013, issued on Jul. 15, 2014 as U.S. Pat. No. 8,782,223; which is a Continuation of U.S. application Ser. No. 13/153,889, filed on Jun. 6, 2011, issued on Jan. 21, 2014 as U.S. Pat. No. 8,635,336; which is a Continuation of U.S. application Ser. No. 12/403,996, filed on Mar. 13, 2009, issued on Jul. 12, 2011 as U.S. Pat. No. 7,979,543; which is a Continuation of U.S. application Ser. No. 10/993,629, filed on Nov. 19, 2004, issued on Jul. 21, 2009 as U.S. Pat. No. 7,565,445; which claims priority to U.S. Provisional Application No. 60/580,841, filed Jun. 18, 2004, to each of which priority is claimed and the entirety of each of which is incorporated herein by reference.

BACKGROUND

The field of the invention relates to computer systems and computer networks, and more particularly, to systems and methods for categorizing content of computer and network traffic.

Many organizations face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, a common solution for blocking unwanted Web activity is to block access to a list of banned or blacklisted websites and pages based on their URLs. However, such approach may be unnecessarily restrictive, preventing access to valid content in websites that may contain only a limited amount of undesirable material. Also, the list of blocked URLs requires constant updating.

Many email spam elimination systems also use blacklists to eliminate unwanted email messages. These systems match incoming email messages against a list of mail servers that have been pre-identified to be spam hosts, and prevent user access of messages from these servers. However, spammers often launch email spam from different hosts every time, making it difficult to maintain a list of spam servers.

It would be desirable to categorize network traffic content, and prevent undesirable network traffic content (e.g., content that belongs to an undesirable category) to be passed to users. Currently, many content detecting systems use human based categorization to categorize network content. In such systems, an operator manually analyzes network content, then uses the results of the analysis to categorize the network content. Although such techniques may produce reliable results, they are labor intensive and time consuming.

In another technique, HTML links are analyzed to determine a characteristic of network content. However, such technique may erroneously mischaracterize network content. Companies have also used other techniques for characterizing network content, but each of these techniques may not produce reliable result.

Accordingly, new systems and methods for categorizing content of computer and network traffic would be useful.

SUMMARY

In accordance with some embodiments, a method for categorizing network traffic content includes determining a first characterization of the network traffic content, determining a first probability of accuracy associated with the first characterization, and categorizing the network traffic content based at least in part on the first characterization and the first probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, and categorizing the network traffic content based at least in part on the first characterization and the first probability of accuracy.

In accordance with other embodiments, a device for categorizing network traffic content includes means for determining a first characterization of the network traffic content, means for determining a first probability of accuracy associated with the first characterization, and means for categorizing the network traffic content based at least in part on the first characterization and the first probability of accuracy.

In accordance with other embodiments, a method for use in a process to categorize network traffic content includes obtaining a plurality of data, each of the plurality of data representing a probability of accuracy of a characterization of network traffic content, and associating each of the plurality of data with a technique for characterizing network traffic content.

In accordance with other embodiments, a computer product includes a computer-readable medium, the computer-readable medium having a set of stored instructions, an execution of which causes a process to be performed, the process comprising obtaining a plurality of data, each of the plurality of data representing a probability of accuracy of a characterization of network traffic content, and associating each of the plurality of data with a technique for characterizing network traffic content.

In accordance with other embodiments, a device for categorizing network traffic content includes means for obtaining a plurality of data, each of the plurality of data representing a probability of accuracy of a characterization of network traffic content, and means for associating each of the plurality of data with a technique for characterizing network traffic content.

In accordance with other embodiments, a method for categorizing network traffic content includes determining a characterization of the network traffic content, determining a weight value associated with the characterization, and categorizing network traffic content based at least in part on the characterization of the network traffic content and the weight value.

In accordance with other embodiments, a computer product includes a computer-readable medium, the computer-readable medium having a set of stored instructions, an execution of which causes a process to be performed, the process comprising determining a characterization of the network traffic content, determining a weight value associated with the characterization, and categorizing network traffic content based at least in part on the characterization of the network traffic content and the weight value.

In accordance with other embodiments, a device for categorizing network traffic content includes means for determining a characterization of the network traffic content, means for determining a weight value associated with the characterization, and means for categorizing network traffic content based at least in part on the characterization of the network traffic content and the weight value.

In accordance with other embodiments, a method for categorizing network traffic content includes determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

In accordance with other embodiments, a system for categorizing network traffic content includes means for determining a first characterization of the network traffic content, means for determining a first probability of accuracy associated with the first characterization, means for determining a second characterization of the network traffic content using a second technique, wherein the second technique is different from the first technique, means for determining a second probability of accuracy associated with the second characterization, and means for categorizing the network traffic content based at least in part on the first characterization, the second characterization, the first probability of accuracy, and the second probability of accuracy.

In accordance with other embodiments, a computer product includes a computer-readable medium, the computer-readable medium having a set of stored instructions, an execution of which causes a process to be performed, the process comprising determining a first characterization of the network traffic content, determining a first probability of accuracy associated with the first characterization, determining a second characterization of the network traffic content using a second technique, wherein the second technique is different from the first technique, determining a second probability of accuracy associated with the second characterization, and categorizing the network traffic content based at least in part on the first characterization, the second characterization, the first probability of accuracy, and the second probability of accuracy.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of various embodiments, in which similar elements are referred to by common reference numerals. More particular descriptions will be rendered by reference to specific embodiments, which are illustrated in the accompanying drawings. Understanding that these drawings are not to be considered limiting in scope, the embodiments will be described and explained with additional specificity and detail through the use of the accompanying figures.

DETAILED DESCRIPTION

Figure 1:
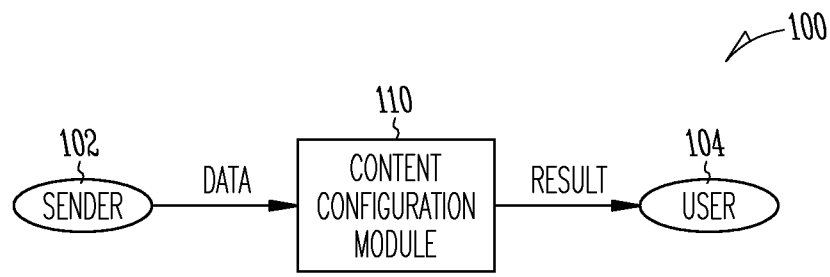
FIG. 1 illustrates a block diagram representing a system that includes a module for categorizing network traffic content in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments, and are not intended as an exhaustive description of the invention, or as a limitation on the scope of the invention. In addition, an illustrated embodiment need not have all the aspects or advantages of the invention shown. An aspect or an advantage described in conjunction with a particular embodiment is not necessarily limited to that embodiment and can be practiced in any other embodiments even if not so illustrated.

FIG. 1 illustrates a block diagram of a system 100, which includes a content categorization module 110 for categorizing network traffic content in accordance with some embodiments. Sender 102 transmits data associated with network traffic content, such as email content or Web content, to module 110. Module 110 receives the transmitted data, determines a category to which the network traffic content belongs (e.g., categorize the network traffic content), and causes a result, such as a message, to be sent to a user 104. The message sent to user 104 notifies the user 104 that a content belonging to a category has been detected. As used in this specification, the term "user" should not be limited to a human user, and can include a server or other types of devices that can receive information. Also, as used in this specification, the term "sender" should not be limited to a human sender, and can include a server or other types of devices that can transmit information.

In some embodiments, module 110 can be implemented using software. For example, module 110 can be implemented using software that is loaded onto a user's computer, a server, or other types of memory, such as a disk or a CD-ROM. In some cases, module 110 can be implemented as Web applications. In alternative embodiments, module 110 can be implemented using hardware. For example, in some embodiments, module 110 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In other embodiments, module 110 can also be any of a variety of circuits or devices that are capable of performing the functions described herein. For example, in alternative embodiments, module 110 can include a general purpose processor, such as a Pentium processor. In other embodiments, module 110 can be implemented using a combination of software and hardware. In some embodiments, module 110 may be implemented as a firewall, a component of a firewall, or a component that is configured to be coupled to a firewall.

Figure 2:
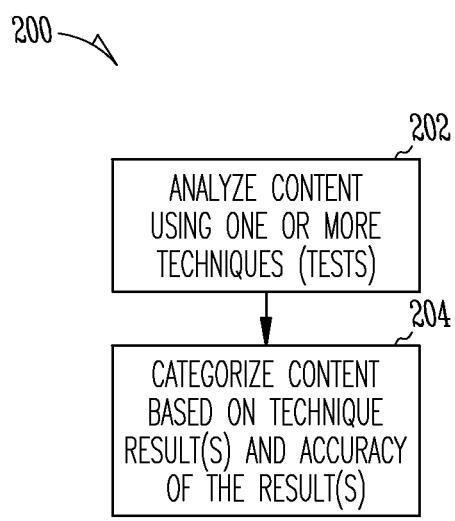
FIG. 2 illustrates a method for categorizing network traffic content in accordance with some embodiments.

FIG. 2 illustrates a method 200 for categorizing network traffic content in accordance with some embodiments. First, module 110 receives data associated with network traffic content and analyzes the content using one or more techniques (Step 202). The techniques used will depend on the type of content being analyzed. For the purpose of the following discussion, it is assumed that the content being analyzed is Web-related content. However, it should be understood by those skilled in the art that the process 200 of FIG. 2 can be used to categorize other types of content.

The illustrated embodiments use four representative techniques (which may be tests) to independently analyze and characterize the Web-related content. The first representative technique involves performing an Internal Link Analysis (ILA). ILA is based on the theory that a website may have HTML links to other sites with similar characteristics. In such cases, module 110 includes an ILA engine for analyzing HTML links within an URL (with predefined depth—number of layers of sub-page). Using such technique, if the majority of links associated with the Web content points to a URL associated with a certain characterization (e.g., educational, advertising, etc.), the Web content is determined (characterized) as having such characterization. The number of available characterizations associated with the ILA technique can vary. For example, in some embodiments, four possible characterizations (reference characterizations) can be made available: educational, advertising, porno, and news.

The second representative technique involves performing an External Link Analysis (ELA). ELA is based on the theory that if most people consider a website as having a certain characterization (e.g., educational, advertising, etc.), the website is then determined to have such characterization. In such cases, a database is maintained (e.g., within module 10 or in a separate memory) that points to a number of prescribed external portal sites that have some categorization of URLs. The portal list is constantly updated and maintained. The portal list can be stored in module 10 or in a separate memory that is coupled to module 10.

The third representative technique involves performing a Meta-Tag Analysis (MTA). MTA is based on the theory that if a majority or a substantial number of meta-tags are associated with a certain characterization (e.g., educational, advertising, etc.), the website is determined as having such characterization. In such cases, module 110 analyzes HTML content and determines if it contains any meta-tags indicating which characterization the content belongs to. For example, if a majority or a substantial number of meta-tags are associated with a certain characterization, module 110 then determines the content as having such characterization.

The fourth representative technique involves performing a Token Analysis (TKA). TKA is based on the theory that if content contains a large number of words having the same attribute, then the content is characterized as having the attribute. In such cases, a database of words and phrases is maintained (e.g., in module 110 or in a separate memory). The words and phrases are abstracted to tokens, which can be used by module 110 to analyze a HTML file's content and determine a characterization for the content. For example, if the content being analyzed contains a plurality of texts, the content can first be normalized to make it more "standard" for processing. Normalization of content, can be performed by, for example, converting all letters to upper case, and replacement of all white space characters and punctuation marks with one character (such as a single white space). Next, the database of words may be accessed. In such a database, words are represented by numbers, and each number is associated with one or more attribute. Since every word is represented by a number, module 110 can perform counting, and determines the frequency that these words appear in the content. If the content contains a large number of words having the same attribute (e.g., educational, pornographic, etc.), then the content is determined as having the attribute (characterization). It should be noted that instead of using TKA to analyze text, in other embodiments, TKA can be implemented to analyze graphic(s), or combination of text and graphic(s).

Although four representative techniques for characterizing network traffic content have been described, the scope of the invention should not be so limited. In other embodiments, instead of using four techniques, module 110 can use a different number of techniques to analyze network traffic content. Also, in other embodiments, instead of the four techniques described previously, module 110 can employ different techniques (e.g., variations of the previously described techniques) or different combination of techniques to analyze network traffic content of various types.

After network traffic content has been analyzed and characterized, module 110 determines a category to which the content belongs (i.e., categorizes the content) based on the characterization by the four representative techniques (Step 204). In the illustrated embodiments, the category is determined by associating each technique with an accuracy. The accuracy associated with each technique represents the accuracy of the characterization determined by the technique.

Figures 3, 4:
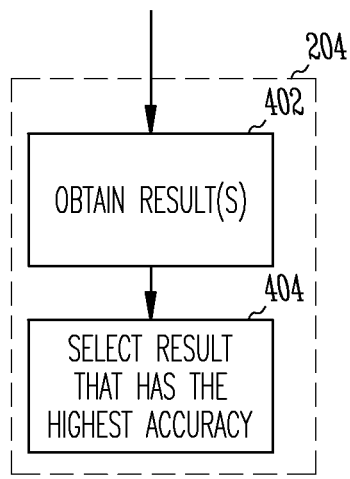
FIG. 3 illustrates ~n example of results obtained using different techniques for characterizing network traffic content in accordance with some embodiments.
FIG. 4 illustrates a method for categorizing network traffic content using an accuracy of a technique result in accordance with some embodiments.

FIG. 3 illustrates an example of results provided by the four representative techniques to characterize a website content. In the example, ILA characterizes the website content as "Porno," ELA characterizes the website content as "Educational," MTA characterizes the website content as "Porno," and TKA characterizes the website content as "News." These characterizations are merely illustrative and could be any of a number of other characterizations. Accuracies of the technique results for the respective four representative techniques are also provided. In the illustrated example, the results provided by the ILA, ELA, MTA, and TKA have a 10% accuracy (Le., a 10% probability that the result is accurate), a 20% accuracy, a 40% accuracy, and a 30% accuracy, respectively.

In some embodiments, module 110 is configured to determine the accuracies associated with different techniques by receiving the accuracies as inputs. For examples, a user can manually input the accuracies into the module 110, or alternatively, the accuracies can be transmitted to the module 110 via a communication link. Alternatively, module 110 can be configured to calculate the accuracies.

Various methods can be employed to determine the accuracy (or probability of accuracy). In the illustrated embodiments, the accuracy can be determined by performing statistical analysis for each of the four techniques. For example, results provided by ILA can be compared with results provided by human categorization (i.e., categorization performed manually), and be analyzed to determine how accurate they are. Such analysis can be carried out for each of the available reference characterizations for each technique. For example, if ILA includes four possible reference characterizations (e.g., Porno, Educational, News, and Advertisement), then statistical analysis can be performed for each of the four reference characterizations to determine how accurate of a result the ILA can provide with respect to each reference characterization. If it is determined from the statistical analysis that ILA provides "Porno" characterization with 10% accuracy, "Educational" characterization with 30% accuracy, "News" characterization with 20% accuracy, and "Advertisement" characterization with 40% accuracy, then every time ILA characterizes network traffic content as "Porno," "Educational," "New," or "Advertisement," a 10%, 30%, 20%, or 40% will be assigned to the result of characterization, respectively. As such, the accuracy (as expressed in probability value) can be characterization-specific for each of the techniques used.

In other embodiments, accuracies for the categories associated with one technique (e.g., ILA) can be processed to determine an average accuracy for the technique. In such cases, the same average accuracy associated with a technique is used for all possible characterizations for the technique. Using this technique for the above example, a 25% (=(10%+30%+20%+40%)/4) accuracy will be associated with results provided by the ILA, regardless of the characterization determined by the ILA.

Although accuracy of a technique has been described as a percentage of probability, in other embodiments, accuracy of a technique can be represented by other variables. For example, in alternative embodiments, a weight value representing an accuracy of a result can be associated with each of the techniques used to analyze network traffic content. In such cases, the weight value can be determined based on probability studies of results of the techniques, as similarly discussed previously. In some embodiments, a weight of 0 value can be used to associate results of a technique when a probability study indicates that such technique has an accuracy below a prescribed threshold (e.g., 10%), and a weight having a value of 2 can be used to associate result of a technique when a probability study indicates that such technique has an accuracy above a prescribed threshold (e.g., 50%).

Various techniques can be used to categorize network traffic content based on accuracies of the results provided.

FIG. 4 illustrates a technique for categorizing network traffic content in accordance with some embodiments. As shown in FIG. 4, the step 204 of categorizing content includes obtaining technique result(s) from step 202 (Step 402), and selecting the result that has the highest accuracy (Step 404). For example, module 110 can be configured or programmed to search for an accuracy that has the highest value, and select the result associated with the highest accuracy for categorizing network traffic content. Using such technique for the above example, module 110 will categorize the content as "Porno" based on the result of the MTA because the MTA characterizes the content as "Porno" and has the highest degree of accuracy (i.e., 40%).

Figure 5:
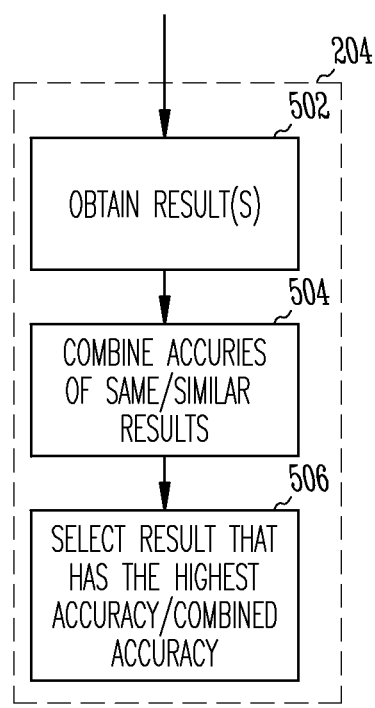
FIG. 5 illustrates a method for categorizing network traffic content using an accuracy of a technique result in accordance with other embodiments.

FIG. 5 illustrates another technique for categorizing network traffic content in accordance with other embodiments. As shown in FIG. 5, the step 204 of categorizing content includes obtaining technique result(s) from step 202 (Step 502), and combining accuracies of two or more characterizations if the characterizations yield the same (or similar) result (Step 504). Using such technique for the above example, module 110 adds the probabilities of accuracy for the ILA and MTA (because these two analysis characterize the network traffic content as "Porno"), thereby producing a combined accuracy of 50% (=10%+40%). The combined accuracy for the characterization is then compared with other accuracies or other combined accuracies for other characterizations, and the characterization associated with the maximum accuracy (or combined accuracy) is then selected to categorize the content (Step 506). Following the above example, the combined accuracy=50% for the "Porno" characterization is compared with the accuracies for the "News" characterization (=30%) and the "Educational" characterization (=10%). Because the "Porno" characterization has the maximum accuracy (=50%), module 110 categorizes the network traffic content as "Porno" based on the combined results provided by the ILA and MTA.

In other embodiments, the module 110 is configured to determine whether an accuracy associated with a result is below or above a prescribed threshold (e.g., by performing a comparison between the accuracy and the prescribed threshold). In such cases, if the accuracy for a technique (e.g., ILA) is below the prescribed threshold, the module 110 then disregards the result provided by the technique. On the other hand, if the accuracy for a technique is above the prescribed threshold, the module 110 then accounts for the result provided by the technique in the content categorization process.

Other algorithms for categorizing network traffic content based on accuracy of technique used can also be employed in other embodiments. For example, in alternative embodiments, the accuracy values can be further processed (e.g., multiplied by one or more weight values), and the processed values are then used to categorize network traffic content.

Figure 6:
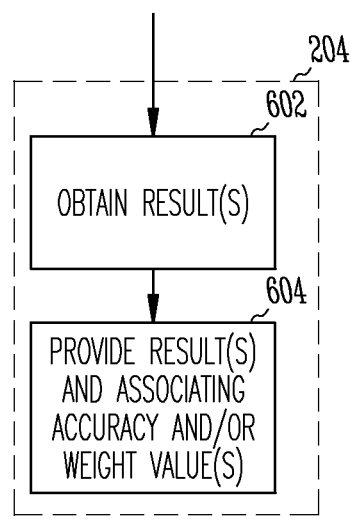
FIG. 6 illustrates a method for categorizing network traffic content using an accuracy of a technique result in accordance with other embodiments.

FIG. 6 illustrates a further technique for categorizing network traffic content in accordance with other embodiments, which does not involve performing an algorithm to categorize network traffic content. As shown in FIG. 6, the step 204 of categorizing content includes obtaining technique result(s) from step 202 (Step 602), and presenting result(s) of characterization by one or more techniques (e.g., ILA) in conjunction with a variable that is associated with an accuracy or quality of the result (Step 604) (FIG. 6). For example, in some embodiments, module 110 categorizes network traffic content by providing a message to user 104, wherein the message includes information, such as those shown in FIG. 3. In such cases, module 110 does not summarily place the content in a category, but allows user 104 to draw his/her conclusion based on the information presented.

It should be noted that although several methods for categorization network traffic content have been described with reference to accuracies for various techniques, the scope of the invention should not be so limited. In alternative embodiments, instead of or in addition to accuracy, other variables can also be used to categorize network traffic content. For example, in other embodiments, a weight value or factor can be associated with a result of a technique. The weight value can represent a characteristic of an analysis method, such as, usage frequency (e.g., higher weight value can be assigned to an analysis method that has a higher usage frequency, and vice versa), complexity of analysis technique (e.g., higher weight value can be assigned to analysis technique that is more advanced or complex), or update frequency (e.g., higher weight value can be assigned to analysis technique for which parameters for characterizing content are updated relatively more frequent). Also, in other embodiments, more than one weight factors for each technique are used. In accordance with another aspect of the invention, a memory is provided for storing accuracy value(s) and/or weight value(s) for each of the technique(s). The memory can be a disk, a computer hard drive, a server, or any device capable of storing electronic information. Such memory can be a component of module 110, a component that is configured to integrate with module 110, or a component that is coupled to module 110 via a communication link (wire or wireless).

As illustrated by the above examples, each of the techniques contributes to a final decision of content categorization. By using more than one technique (e.g., ILA, ELA, MTA, TKA) to characterize network traffic content, user 104 can obtain a more accurate content categorization (because one analysis technique may be more accurate than another). Also, including accuracy and/or weight value(s) associated with a technique result in a content categorization process is advantageous because they account for a quality and/or nature of the content categorization, thereby rendering the categorization result more accurate. In some cases, if the final decision is non-conclusive (e.g., result does not meet prescribed criteria for categorizing content), the content will be flagged and be sent to an operator for manual verification.

Although embodiments of module 110 and process 200 have been described with reference to categorizing Web content, it should be understood that the same or similar methods and modules may also be used to categorize other content, such as FTP, public server addresses, emails, telnet data, instant messenger data, SSH data, SFTP data, and any electronic information. In some embodiments, module 110 includes a protocol differentiator (not shown), which examines headers of the network traffic and determines the types of content being screened. Module 110 then analyzes content using prescribed analysis method(s) (e.g., ILA) for the type of content. For example, if it is determined that the network traffic content is Web content, then all four techniques (ILA, ELA, MTA, TKA) can be used to analyze the content. On the other hand, if it is determined that the network traffic content is an email, then only TKA, for example, is used to analyze the content. In some embodiments, each type of network traffic content is pre-assigned to a port of a network gateway by a default configuration. For example, HTTP, SMTP, POP, IMAP, and FTP data may each be pre-assigned to be transmitted through a designated port. In such case, protocol differentiator can determine a type of content based on an identification of a port transmitting the network content. In other embodiments, protocol differentiator can be configured to scan all available ports in order to determine a type of the network traffic content being screened.

Also, in other embodiments, instead of, or in addition to, determining a categorization of network traffic content, module 110 can be configured to control flow of network traffic content based on a determined characteristic of the network traffic content. For example, module 110 can be configured to block HTTP request, thereby preventing undesirable content, such as a Web page containing undesirable content, from being transmitted to user 104. In other cases, module 110 may erase network traffic content, or modify network traffic content based on a determined characteristic of the network traffic content, such that only portion(s) of the content is allowed to pass to user 104.

In some embodiments, a user interface can be provided that allows user 104 to select criteria or parameters for categorizing network traffic content. For example, module 110 can allow user 104 to set threshold(s) (e.g., minimum accuracy required before it should be considered), select weight values to be considered in a content categorization process, and designate number of categories for each content (sometimes a content can be categorized as belonging to more than one categories). Also, in other embodiments, the module 110 can allow user 104 to select which technique(s) (e.g., ILA, ELA, etc.) to use for a certain type of network content, and how result(s) of technique(s) is to be processed.

Computer Architecture

Figure 7:
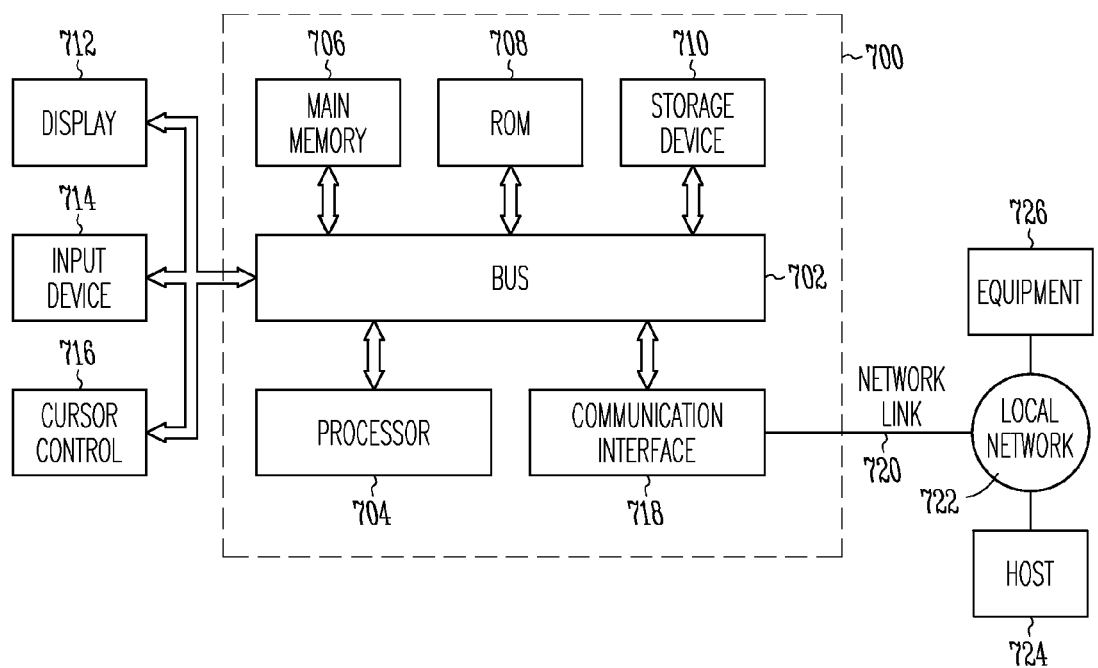
FIG. 7 is a diagram of a computer hardware system with which embodiments of the present invention can be implemented.

As described previously, module 110 can be implemented using software, hardware, or combination therefore. However, those skilled in the art understand that a computer system may also be used to implement module 110 to perform the functions described herein. FIG. 7 is a block diagram that illustrates an embodiment of a computer system 700 upon which embodiments of the method 200 may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 may further include a read only memory (ROM) 708 or other static storage device coupled to bus 702 for storing static information and instructions for processor 704. A data storage device 710, such as a magnetic disk or optical disk, is provided and coupled to bus 702 for storing information and instructions.

Computer system 700 may be coupled via bus 702 to a display 712, such as a cathode ray tube (CRT), for displaying information to user 104. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 can be used for processing network traffic content. According to some embodiments, such use may be provided by computer system 700 in response to processor 704 executing one or more sequences of one or more instructions contained in the main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement embodiments described herein. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to, non-volatile media, and volatile media. Non-volatile media includes, for example, optical or magnetic disks, such as storage device 710. Volatile media includes dynamic memory, such as main memory 706.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry data streams representing various types of information.

Network link 720 typically provides data communication through one or more networks to other devices. For example, network link 720 may provide a connection through local network 722 to a host computer 724. Network link 720 may also transmits data between an equipment 726 and communication interface 718. The data streams transported over the network link 720 can comprise electrical, electromagnetic or optical signals. The signals through the various networks and the signals on network link 720 and through communication interface 718, which carry data to and from computer system 700, are exemplary forms of carrier waves transporting the information. Computer system 700 can send messages and receive data, including program code, through the network(s), network link 720, and communication interface 718. Although one network link 720 is shown, in alternative embodiments, communication interface 718 can provide coupling to a plurality of network links, each of which connected to one or more local networks. In some embodiments, computer system 700 may receive data from one network, and transmit the data to another network. Computer system 700 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 110 may be implemented using one or more processors or one or more software. Also, in alternative embodiments, module 110 needs not perform all of the steps in FIG. 2. For example, in other embodiments, module 110 does not analyze content data (i.e., does not perform Step 202), but receives results of analysis from a source. In such cases, based on results of analysis received, module 110 then categorize network traffic content based on accuracies of the results. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A computer-implemented method of categorizing electronic message content comprising:
receiving, via a network interface device of a networked device on which the method is implemented through instructions executable by at least one processor, an electronic message;
determining, through execution of instructions of an electronic message content categorization module on the at least one processor, that the electronic message likely includes undesirable content, the determining performed according to at least two different analysis techniques to obtain at least two different potential categorizations of the electronic message indicating the electronic message likely includes undesirable content, the at least two different analyses performed as a function of a database of known categorization properties of electronic message content;
in accordance with a determination that at least two or more categorizations are of the same categorization type, adding all the probabilities of the at least two or more categorizations of the same categorization type creating a summation probability for the same categorization type;
comparing the summation probability with the probabilities of all other categorizations;
selecting the categorization with the highest probability from all categorizations including the categorization assigned with the summation probability; and
storing, on a data storage device, by the electronic message content categorization module, a representation of the determination that the electronic message likely includes undesirable content and data derived from the electronic message such that the stored representation is available to assist in processing subsequently received electronic messages.

2. The method of claim 1, further comprising:
processing subsequently received electronic messages according to the at least two different analyses as a function of the stored representation of the determination that the electronic message likely included undesirable content.

3. The method of claim 1, wherein storing the representation of the determination that the electronic message likely included undesirable content and data derived from the electronic message includes storing the representation in the database of known categorization properties of electronic message content.

4. The method of claim 1, wherein the electronic message comprises text-based chat messages.

5. The method of claim 1, wherein the electronic message is an email.

6. The method of claim 1, wherein the network traffic content comprises content received over a network according to the Hypertext Transport Protocol and an email protocol.

7. The method of claim 1, wherein the at least two different analyses includes at least one of an internal link analysis, an external link analysis, a meta tag analysis, and a token analysis.

8. The method of claim 1, wherein the electronic message content categorization module receives a copy of the electronic message content to build the database of known categorization properties of electronic message content and an electronic message content screening module screens electronic message content destined for users according to the database of known categorization properties of electronic message content.

9. A non-transitory device-readable storage medium, with instructions thereon which when executed by at least one processor of a network device, causes the network device to screen electronic message content by:
receiving, via a network interface device of a networked device on which the method is implemented through instructions executable by at least one processor, an electronic message;
determining, through execution of instructions of an electronic message content categorization module on the at least one processor, that the electronic message likely includes undesirable content, the determining performed according to at least two different analysis techniques to obtain at least two different potential categorizations of the electronic message indicating the electronic message likely includes undesirable content, the at least two different analyses performed as a function of a database of known categorization properties of electronic message content;
in accordance with a determination that at least two or more categorizations are of the same categorization type, adding all the probabilities of the at least two or more categorizations of the same categorization type creating a summation probability for the same categorization type;
comparing the summation probability with the probabilities of all other categorizations;
selecting the categorization with the highest probability from all categorizations including the categorization assigned with the summation probability; and
storing, on a data storage device, by the electronic message content categorization module, a representation of the determination that the electronic message likely includes undesirable content and data derived from the electronic message such that the stored representation is available to assist in processing subsequently received electronic messages.

10. The non-transitory device-readable storage medium of claim 9, further comprising:
processing subsequently received electronic messages according to the at least two different analyses as a function of the stored representation of the determination that the electronic message likely included undesirable content.

11. The non-transitory device-readable storage medium of claim 9, wherein storing the representation of the determination that the electronic message likely included undesirable content and data derived from the electronic message includes storing the representation in the database of known categorization properties of electronic message content.

12. The non-transitory device-readable storage medium of claim 9, wherein the electronic message comprises text-based chat messages.

13. The non-transitory device-readable storage medium of claim 9, wherein the electronic message is an email.

14. The non-transitory device-readable storage medium of claim 9, wherein the network traffic content comprises content received over a network according to the Hypertext Transport Protocol and an email protocol.

15. The non-transitory device-readable storage medium of claim 9, wherein the at least two different analyses includes at least one of an internal link analysis, an external link analysis, a meta tag analysis, and a token analysis.

16. The non-transitory device-readable storage medium of claim 9, wherein the electronic message content categorization module receives a copy of the electronic message content to build the database of known categorization properties of electronic message content and an electronic message content screening module screens electronic message content destined for users according to the database of known categorization properties of electronic message content.

17. A network device comprising:
at least one processor;
at least one memory device;
at least one network interface device;
an electronic message content categorization module stored on the at least one memory device and executable by the at least one processor to:
receive, via the at least one network interface device, an electronic message;
determining, that the electronic message likely includes undesirable content, the determining performed according to at least two different analysis techniques to obtain at least one categorization of the electronic message indicating the electronic message likely includes undesirable content, the at least two different potential categorizations of the electronic message indicating the electronic message likely includes undesirable content, the at least two different analyses performed as a function of a database of known categorization properties of electronic message content;
in accordance with a determination that at least two or more categorizations are of the same categorization type, adding all the probabilities of the at least two or more categorizations of the same categorization type creating a summation probability for the same categorization type;
comparing the summation probability with the probabilities of all other categorizations;
selecting the categorization with the highest probability from all categorizations including the categorization assigned with the summation probability; and
storing a representation of the determination that the electronic message likely includes undesirable content and data derived from the electronic message such that the stored representation is available to assist in processing subsequently received electronic messages.

18. The network device of claim 17, wherein the electronic message is an email.

19. The network device of claim 17, wherein the at least one analysis technique includes at least one of an internal link analysis and an external link analysis.

20. The network device of claim 17, wherein the electronic message content categorization module receives a copy of the electronic message content to build the database of known categorization properties of electronic message content and an electronic message content screening module screens electronic message content destined for users according to the database of known categorization properties of electronic message content.

\* \* \* \* \*